United States Patent
Iliffe-Moon

(10) Patent No.: US 11,531,158 B2
(45) Date of Patent: Dec. 20, 2022

(54) OPTICAL FACEPLATE FOR A TWO DIMENSIONAL DISPLAY AND A DISPLAY SYSTEM

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/331,697

(22) Filed: May 27, 2021

(65) Prior Publication Data

US 2021/0373230 A1    Dec. 2, 2021

(30) Foreign Application Priority Data

May 27, 2020 (EP) .................................. 20176849
May 27, 2020 (EP) .................................. 20176851

(51) Int. Cl.
| | | |
|---|---|---|
| *G02B 6/06* | (2006.01) | |
| *G02B 30/50* | (2020.01) | |
| *G02B 6/08* | (2006.01) | |
| *G02B 30/56* | (2020.01) | |

(52) U.S. Cl.
CPC ............. *G02B 6/06* (2013.01); *G02B 6/08* (2013.01); *G02B 30/50* (2020.01); *G02B 30/56* (2020.01)

(58) Field of Classification Search
CPC ... G02B 6/06; G02B 6/08; G02B 6/26; G02B 30/50; G02B 30/56; G02B 27/0093
See application file for complete search history.

(56) References Cited

U.S. PATENT DOCUMENTS

| | | | | |
|---|---|---|---|---|
| 8,122,626 B2* | 2/2012 | Schnuckle | .............. | G09F 23/00 40/406 |
| 8,308,329 B1* | 11/2012 | Sethna | .............. | G09F 9/305 362/555 |
| 8,331,749 B2* | 12/2012 | Lew | .............. | G02B 6/0036 385/115 |
| 9,188,737 B2* | 11/2015 | Joseph | .............. | G02B 6/06 |
| 2014/0147087 A1 | 5/2014 | Lambert et al. | | |
| 2015/0094122 A1* | 4/2015 | Huang | .............. | H04M 3/02 455/567 |

FOREIGN PATENT DOCUMENTS

| | | |
|---|---|---|
| DE | 102014200035 A1 | 7/2015 |
| EP | 2824896 A1 | 1/2015 |
| EP | 3157157 A1 | 4/2017 |
| EP | 3671718 A1 | 6/2020 |
| KR | 1020170129012 A | 11/2017 |

OTHER PUBLICATIONS

Schott: "An Introduction to Fiber Optic Imaging (Second Edition)", May 30, 2007, XP055743594, https://www.us.schott.com/d/lightingimaging/2e22eb88-bab2-4256-92de-46df689b255d/schott-introduction-on-fiber-optics-imaging-english-16082018.pdf.

\* cited by examiner

*Primary Examiner* — Daniel Petkovsek
(74) *Attorney, Agent, or Firm* — 2SPL Patent Attorneys PartG mbB; Kieran O'Leary

(57) ABSTRACT

An aspect relates to a system with an optical faceplate for use with a two dimensional display. The optical faceplate comprises a contact surface at a bottom side of the optical faceplate for contacting the two dimensional display. The optical faceplate further comprises a three dimensional display surface at a top side of the optical faceplate, and an optic light guide material provided between the contact surface and the three dimensional display surface.

9 Claims, 3 Drawing Sheets

OPTICAL FACEPLATE FOR A TWO DIMENSIONAL DISPLAY AND A DISPLAY SYSTEM

CROSS-REFERENCE TO RELATED APPLICATIONS

This application claims priority to European Applications 20176849.6 and 20176851.2, both filed on May 27, 2020. The contents of these earlier filed applications are incorporated by reference herein in their entirety.

FIELD

Examples relate to an optical faceplate for use with a two dimensional display. Further examples relate to a display system comprising a two dimensional display and an optical faceplate. Examples relate to a system comprising a floating output device for a user interface, the floating output device comprising a display and an optical faceplate.

BACKGROUND

In modern vehicles, user interaction between a user and vehicle systems (e.g. entertainment system, driving system, information system, etc.) is becoming more important as the number of functions of vehicles constantly increases. For example, in view of autonomous driving, the user of a vehicle has much more time to spend with such systems as there might be no more need for driving the car. For example, user interaction systems and output devices (e.g. displays) are becoming more important.

For providing an output of the system to the user, display screens may be used. For example, digital displays are increasingly replacing analogue gauges, dials and instruments, however normal digital displays are flat 2D surfaces that lack the perceived value and 3-dimensional detail of an analogue instrument, for example. Current display technology may be limited to two-dimensional (2D) flat surfaces, e.g. due to cost constraints or technological constraints. For example, some other concepts provide flexible displays that can be curved across one axis only. Such displays may be limiting with respect to design of the display surface and may further be cost intensive.

SUMMARY

There may be a desire for improved display concepts.

This desire is addressed by the subject matter of the independent claims. Further examples of the proposed concepts are described in the dependent claims, the following description and in combination with the figures.

Examples of the present disclosure relate to an optical faceplate for use with a two dimensional display. The optical faceplate comprises a contact surface at a bottom side of the optical faceplate for contacting the two dimensional display, a three dimensional display surface at a top side of the optical faceplate, and an optic light guide material provided between the contact surface and the three dimensional display surface. By using the optical faceplate, a display system with a 3D surface may be provided by using conventional 2D display technologies, for example. An aspect may be to provide an improved three-dimensional display or interface with respect to an optical and/or tactile appearance, for example.

Further examples relate to a display system comprising a two dimensional display and an optical faceplate. The display system may enable a three-dimensional (3D) display surface due to the combination of a regular 2D display and the optical faceplate. For example, the display system may enable to produce cheaper 3D displays. For example, the three dimensional display surface of the optical faceplate may be more flexible regarding its design (e.g. geometry) compared to other concepts of 3D displays.

Further examples relate to a system comprising a floating device which is at least configured as an output device for a user interface and a base element for the floating device. The system is configured to hold the floating device in a balanced position above the base element in an operation mode of the system. The floating device comprises a two dimensional display and an optical faceplate is positioned on the two dimensional display of the floating device. The use of the optical faceplate on the floating device, e.g. a user input/output device, may enable a better perception of the output for the user compared to a device with a 2D display surface. For example, the three dimensional display surface of the optical faceplate of the floating device may improve a functionality of the floating device, e.g. the input/output device.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
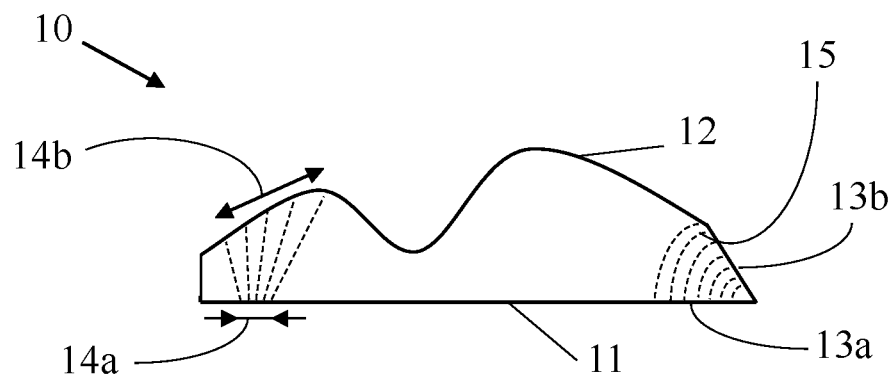
FIG. 1 shows a schematic side view of an optical faceplate.

FIG. 1 shows a schematic side view of an optical faceplate 10 for use with a two dimensional display. The optical faceplate 10 comprises a contact surface 11 at a bottom side of the optical faceplate 10 for contacting the two dimensional display. The optical faceplate 10 further comprises a three dimensional display surface 12 at a top side of the optical faceplate 10. The optical faceplate 10 further comprises an optic light guide material provided between the contact surface 11 and the three dimensional display surface 12.

The optical faceplate 10 can be positioned on top of the 2D display, for example. The contact surface 11 may contact the display surface of the 2D display such that light emitted from the 2D display can be received by the contact surface 11. The optic light guide material is configured to transduce the light from the contact surface 11 to the three dimensional display surface 12. In consequence, when using the optical faceplate 10, the light (e.g. display content) of the 2D display may be displayed or may appear on the three dimensional display surface 12 of the optical faceplate 10. As the three dimensional display surface 12 has a more complex surface geometry (three dimensional), the optical faceplate 10 may enable to provide a 3D display by use of 2D display technology.

For example, the optic light guide material which is provided to transmit light from the contact surface 11 to the three dimensional display surface 12 may comprise polymer and/or glass. For example, any light transmitting material (e.g. transparent material) may be used. Further improvements for controlled (e.g. directed) transmission may be achieved when the optic light guide material is a fiber based material, for example. For example, the optic light guide material may be configured to transmit light from a defined first portion of the contact surface 11 to a defined first portion of the three dimensional display surface 12. For example, the light received at the first portion of the contact surface 11 may be exclusively transmitted to the first portion of the three dimensional display surface 12 but not to other portions of the three dimensional display surface 12, for example.

FIG. 1 schematically shows the use of optic fibers 15 which optically connect corresponding portions of the contact surface 11 and the three dimensional display surface 12. For example, when contacted to a 2D display, light received at a first portion 13a of the contact surface 11 is transmitted via the optic fibers 15 and displayed at a corresponding first portion 13b of the three dimensional display surface 12 (e.g. a plane first portion 13b arranged in an angle to another portion of the three dimensional display surface 12). In a similar way, a second portion 14a of the contact surface 11 is coupled to a second portion 14b of the three dimensional display surface 12 (e.g. a curved shaped second portion 14b). The 2D display may be of any shape, e.g. rectilinear (any aspect ratio), circular, octagonal, complex shape, etc.

For example, an areal extension of the contact surface 11 may differ from an areal extension of the three dimensional display surface 12. This may enable to alter the display size which appears to the user, for example. For example, the three dimensional display surface 12 may be larger than the contact surface 11 such that an enlarged display surface may be achieved. For example, the 2D display may be a small high resolution display and the optical faceplate 10 may be used to enlarge the surface size while accepting a smaller resolution on the three dimensional display surface 12, for example. The 2D display may be a projection module, micro-LED display, micro-display, etc. For example, the extension of the second portion 14b of the three dimensional display surface 12 may be larger than the extension of the corresponding second portion 14a of the contact surface 11 so that a magnification effect may be achieved. In general, the optical faceplate 10 may enable to scale up or scale down the display size of the 2D display.

For example, the areal extension of the three dimensional display surface may be at least 1.3 times (or at least 1.5 times, at least 2 times, or at least 3 times) and/or at most 5 times (or at most 3 times or at most 2 times) the areal extension of the contact surface. This may enable to provide an optical faceplate 10 with altered display size adapted to a specific 2D display and/or to a specific application (e.g. input/output device), for example.

For example, the three dimensional display surface 12 may be at least partly curved shaped (for example the second portion 14b of the three dimensional display surface 12). For example, the three dimensional display surface 12 may be curved with regard to at least two axes. For example, the three dimensional display surface 12 may have a dome shape (see also the example given in FIG. 8).

As an alternative or in addition, the three dimensional display surface 12 may comprise at least two plane surface portions that are arranged to each other at an angle of at least 5 degrees (or of at least 10 degrees, of at least 20, of at least 30 or of at least 45 degrees) and/or of at most 90 degrees (or of at most 60 degrees). This may enable an improved appearance of the three dimensional display surface 12 for a user, for example. For example, two separate portions (e.g. for different display content) may be separated in two planes arranged at a specific angle to each other. For example, the three dimensional display surface 12 may have a facet shape (e.g. in form of a cut diamond; see also the example given in FIGS. 3, and 5 to 7, for example).

A 2D display that can be used with the optical faceplate 10 may be a display or display device with a flat display surface, e.g. the whole display of the 2D display device may be extended in one plane (e.g. x/y plane of Cartesian coordinate system). The display may use any display technology, e.g. liquid crystal display (LCD), light-emitting diode (LED), backlit LCD, thin-film transistor (TFT) LCD, light-emitting diode (LED) display, OLED display, AMO-LED display, plasma (PDP) display, quantum dot (QLED) display or the like, or a projection based approach. For example, the 2D display may be already a curved display and the three dimensional display surface 12 of the optical faceplate 10 may have a more 3D shape than the surface of the 2D display, for example.

For example, the contact surface 11 may be a plane surface. For example, the plane may be flat (e.g. in an x/y coordinate system). Alternatively, the plane surface may be curved, e.g. with respect to one single axes, to enable use in combination with a curved 2D display.

For example, the optical faceplate 10 may have a contact surface 11 which is circular shaped. This kind of shape may be suitable for circular 2D displays, for example. Circular 2D displays may provide improved functionality in combination with display functions of user devices such as controllers (e.g. an interactive rotary control switch). A 3D appearance of the display of such rotating devices may enable improved visibility of the display from all side perspectives of the rotating device.

For example, the optical faceplate 10 may be used for an input/output system. For example, the three dimensional display surface 12 may provide a touch functionality such that a 3D touchscreen may be provided. For example, a first portion of the three dimensional display surface 12 may have a polished surface, wherein a second portion of the three dimensional display surface 12 may have has a textured surface, for example. The first and second display portions may have different surface structures to enable different tactile perception for a user, for example. The digital content of the display may also be mapped to the 3-dimensional surface structure (e.g. different graphics appear on different facets). The different surface structures may enable tactile differentiation of separated portions of the three dimensional display surface 12, for example to enable an easier and/or more accurate handling of the 3D touch display for the user. For example, a first portion of the three dimensional display surface 12 may be polished (e.g. mirror polished) may have a texture (e.g. there may be multiple finishes on a single faceplate).

Figure 2:
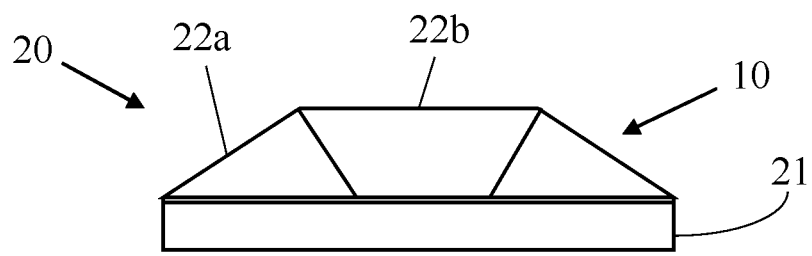
FIG. 2 shows a schematic side view of a system with a 2D display and an optical faceplate.

FIG. 2 shows a schematic side view of a display system 20 comprising a two dimensional display 21 and an optical faceplate 10, e.g. as described in combination with FIG. 1.

The display system 20 may be configured as an output system, for example. Alternatively, the display system 20 may be used as input/output device, e.g. for a user interaction system. For example, the display system 20 may have a 3D touchscreen surface. Accordingly, the display system 20 may further comprise a sensor configured to detect a touch of a user on the three dimensional display surface 12 to provide a touch screen functionality of the three dimensional display surface 12. The sensor may be a capacitive sensor, for example. The sensor may be a pressure sensor or any kind of tactile sensor or touch sensor.

For example, an extension of the contact surface 11 of the optical faceplate 10 may be smaller than an extension of a display surface of the two dimensional display 21. In other words, the contact surface 11 may be designed such it does not cover all parts of the display surface of the 2D display 21. Leaving at least one portion of the 2D display surface free, an appearance of a mixed 2D/3D display may be provided, for example. When used in a user input/output device, the partly use of the optical faceplate 10 may result in improved haptic functionality of the input/output device, for example. For example, the optical faceplate 10 may be ring shaped to leave a center part of the 2D display surface open.

A center portion 22b of the three dimensional display surface 12 may be arranged in an angle to a side portion 22a of the three dimensional display surface 12, e.g. with the result of a sloped side portion 22a. For example, the upper side of the display system 20 may be angular shaped.

For example, the optical faceplate 10 may be connected to the two dimensional display bonding and/or a mechanical connection. To manufacture the system 20, the optical faceplate 10 may be molded to the 2D display 21 in a separate process step, for example. Generally, the faceplate 10 may be coupled, connected or attached to the 2D display 21, e.g. it can be coupled by bonding (e.g. using an adhesive, UV curing adhesive, mechanically held in place, etc.). For example, a transparent adhesive layer may be positioned between the contact surface 11 and the 2D display 21. For example, instead of fixing (e.g. rigid connection) the optical faceplate 10, it may be movably fixed, e.g. by a magnetic mechanism. This may enable to move the optical faceplate 10 on the two dimensional display (e.g. rotating or displacing the optical faceplate 10 on the display), for example.

An example relates to a ring like faceplate (e.g. entire ring or ring segment) that is provided or usable on an instrument panel display (e.g. to reference the appearance of an analogue instrument panel) to provide a combined flat display with localized 3D display features. For example, two or more ring like faceplates may be arranged on a 2D display to form an instrument panel display for a vehicle.

More details and aspects of the concept are mentioned in connection with the proposed concept or one or more examples described above or below (e.g. FIGS. 1 and 3 to 8). The concept may comprise one or more additional optional features corresponding to one or more aspects of the proposed concept or one or more examples described above or below.

Figure 3:
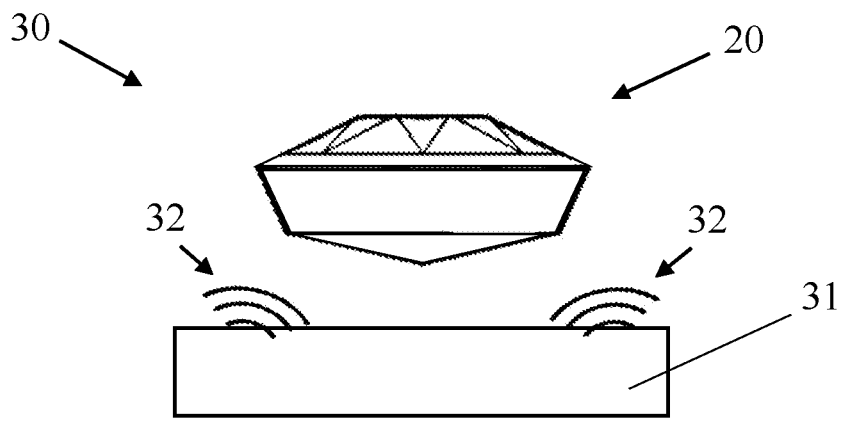
FIG. 3 shows a schematic system comprising a floating device with an optical faceplate.

FIG. 3 shows a schematic view of a system 30 comprising a floating device with an optical faceplate 10 and a 2D display (e.g. a display system 20 as described above or below). The optical faceplate 10 is positioned on the two dimensional display of the floating device.

The floating device is at least configured as an output device for a user interface (e.g. the floating device may be an input/output device). The system 30 further comprises a base element 31 for the floating device. The system 30 is configured to hold the floating device in a balanced position above the base element 31 in an operation mode of the system 30.

The floating device may be maintained in a floating position (e.g. balanced position or levitating position) by a magnetic field 32 generated by coils in the base element 31 which interacts with magnets of the floating device, for example. The floating device may be rotated for receiving user input, for example. The 3D shape of the optical faceplate 10 at the floating device may result in better visibility of the display surface of the floating device, for example tilted side display portions of the three dimensional display surface 12 may be better visible to a user than a plane 2D display on top of the floating device.

Accordingly, the optical faceplate 10 may be used in any kind of user input/output device, in particular in combination with rotating input/output devices, for example to enable improved functionality of the input/output device.

Examples of the present disclosure relate to a system comprising a floating device and a base element for the floating device. The floating device is configured as at least one of an input device or an output device for a user interface. For example, the floating device may be an input/output device. The system is configured to maintain the floating device in a balanced position above the base element in a first operational mode, and to locate the floating device in a docking position on a top side or surface of the base element in a second operational mode.

For example, the floating device configured as input/output user device may be used in a vehicle. The floating device may be described as user device or user controller, for example. The increasing number of different functionalities in modern vehicles may be controlled by the floating device (e.g. provided as a central user device). The balanced position may be a levitating position, for example, such that the floating device can be moved in any direction. For example, the floating device may be a multiple degree-of-freedom input device that may be operable by at least one of rotating, tilting, moving, pushing, touching, tapping, placing, removing (e.g. if the floating device has an access function), reaching towards (e.g. proximity), etc. for example. The floating device may improve a functionality of a user interaction system, e.g. due to multi modal user feedback and/or the possibility for multi modal user input.

The floating device may be particularly well suitable for use in vehicles due to the provided docking mode, for example. In the docking position, the floating device may be positioned at the base element, e.g. fixed to the base element. The docking position may be a position in which the floating device may maintain a physical contact with the base element (e.g. with a larger contact area compared to a contact area while the floating device is operated in the balanced position). For example, due to the provided docking position, it may be possible to meet regulatory requirements for user devices in a car.

Further examples of the present disclosure relate to a vehicle comprising a user interface and a system with a floating device and a base element. The system is configured to control the operational mode of the floating device depending on a movement of the vehicle. Controlling the operational mode based on the movement of the car may enable to meet regulatory requirements, for example. It may be possible to operate the floating device in the balanced position while the vehicle is standing, for example for providing full functionality of the user input/output device. For example, while the car is moving, the floating device may be operated in the docking position, e.g. to improve a functionality of keeping the floating device within a predefined distance to the base element. For example, in the docking position the input functionality may be reduced compared to the floating position, e.g. the floating device may be rotated and/or pushed for receiving user input.

Further examples of the present disclosure relate to a floating device for an input/output system for a user interface. The floating device comprises a magnet element which is arranged circularly in the floating device, and an output element. An upper portion of the floating device is cone-shaped and the output element is provided at the cone-shaped portion. Providing the output element, e.g. a display or the like, at the upper cone-shaped portion may improve the visibility of the output element for a user, for example. Especially in vehicles, the floating device may be positioned next to a user, so that the output element may be better perceived by the user when it is positioned on a sloped side portion of the floating device, for example.

Concepts may include the possibility of sensing the object, e.g. the floating device. It may be possible using both inside-out sensing (e.g. a sensor onboard the object such as an IMU) and/or outside-in sensing (e.g. a RGB or IR camera, radar, LIDAR, etc.). The system may enable sensing the user, e.g. by using sensor technologies (e.g. a RGB or IR camera, radar, LIDAR, etc.) to detect the user (e.g. fingers, hand, arm, etc.) relative to the object. Further, proposed concepts may include analyzing (e.g. by combining the sensor data of the object and the user) and/or directly sensing the users interaction with the object (e.g. proximity, gesture, touch, manipulation (e.g. direct finger/hand manipulation of the object, such as touching, pushing/pulling, lifting, rotating, sliding) etc.).

Examples relate to a multisensory object (e.g. floating device)—e.g. providing lighting/illumination, ambient GUI (abstract/ambient display/GUI), interactive GUI (conventional pixel based GUI), sound, motion and haptic, thermal, etc. For example, multisensory integration with the vehicle systems (e.g. infotainment, entertainment, climate control, experience modes, driving modes, ambient lighting, seat and massage systems, window shades, scent dispenser, etc.) may be achieved. For example, integration with multi-modal interaction systems—e.g. Intelligent Personal System (IPA), voice, eye gaze/tracking, gesture, etc. may be achieved. The floating device may be provided in a vehicle for example (not shown in FIG. 3).

Examples relate to controlling a user interface of the vehicle (e.g. controlling a GUI (graphical user interface)/HMI (human machine interface)), features or functionality. The features/functions may be static or dynamic GUI elements depending on the context of the interaction, for example. Features may relate to conventional features (e.g. infotainment, climate control, vehicle modes, etc.) and novel features (e.g. sensory experiences, scent based experience, wellness experiences, etc.). Electromagnetic levitation and motion control of the object (e.g. floating device) may be enabled. Sensing the object (e.g. floating device), e.g. position, motion, etc. may be enabled. Sensing the user—e.g. sensing touch, proximity, manipulation, user state, eye gaze, face recognition, emotion recognition (affective computing), biometrics, bio-signals, etc. may be enabled. Sensing the state of the vehicle and/or analyzing vehicle data (e.g. 3-dimensional motion (e.g. XYZ directions, cornering/turning, vibration, bumps, etc.), acceleration/deceleration, parked/static, forwards/reverse, etc.) may be enabled. Analyzing the combined data to determine the interaction between the user and the object may be possible. A feedback loop may be generated between the user and the object such that interactions between the user and the object are bidirectional (e.g. when the object is pushed by the user, the object can push back, depending on the context of the GUI function/feature), for example.

The floating device may provide a multisensory experience, e.g. enabled by: an OLED display, and/or touchscreen display, LEDs, audio speaker, haptic actuator, thermal device, etc. The floating device may have onboard (inside-out) sensors that may allow the system to sense touch, proximity, manipulation, user state, eye gaze, etc. (e.g. capacitive or piezo touch surfaces, IMU to detect motion/acceleration, biometric/bio signal sensors (e.g. similar to those found on a smartwatch, e.g. optical sensors, ECG, GSR, etc.). The behavior of the floating device may be coordinated with the electromagnetic (and/or electromechanical) functionality. The floating device may be powered by a battery and/or be a wireless connection and/or wired connection (e.g. conductive electrical contacts).

Aspects relate to a user Experience/user Interaction that can be provided, e.g. in a vehicle. The interaction with and around the floating device may affect: a user interface (HMI/GUI) on the floating device itself (e.g. an OLED display and/or touchscreen, LEDs, etc.); a HMI/GUI in the vehicle—e.g. integrated with typical vehicle systems; e.g. the interaction may control features such as: Infotainment, entertainment, climate control, experience modes, sensory modes, etc.; an HMI/GUI that is provided in addition to the standard HMI/GUI (e.g. of the vehicle) (i.e. the floating device may unlock/enable optional, additional and/or customized (e.g. premium class) features that are not available on a standard vehicle, for example). Direct manipulation (e.g. touch, push/pull, turn/twist, tilt, etc.) of the floating device may provide a user input to the user interface (e.g. GUI of the vehicle that comprises a display and/or VR (virtual reality) and/or AR (augmented reality) and/or digital projection based). Interactions (e.g. proximity, hand gesture, eye gaze, face recognition, emotion recognition (affective computing), biometrics, biosignals, etc.) in the space surrounding the floating device (but not necessarily touching the floating device) may provide a contextual interaction space depending on the state/mode of the GUI (e.g. display, projection, VR, AR, MR, etc.), for example. Interactions in the space and surrounding the floating device and with the floating device itself may be combined to create a continuous interaction (e.g. depending on the mode of the GUI, the users hand moving towards the floating device, touching the floating device and pushing/pulling the floating device might be recognized as a single or continuous gesture/interaction). The GUI interaction model may include a digital representation (e.g. photorealistic, abstract, artistic, etc.) of the object(s) and may be based on a physical interaction mental model that represents the real life degrees of freedom of the object(s), for example.

An aspect of the disclosure relates to a concept of how to activate the mentioned gaze control function of a vehicle (not shown in FIG. 3) by using the floating device. It is possible that the system is configured to activate the eye gaze function only when a user touches the controller or when holding it in the hand. This can e.g. help to save energy compared to systems with continuously activated gaze control. For example, when the user does no longer touch the floating device, the gaze control function may be deactivated, e.g. after a predefined duration of time (e.g. 1 min. after the user stops touching the floating device). Instead of direct touch, also proximity sensors may be used to detect the user (e.g. a user's hand) in the proximity of the floating device in order to activate the gaze control function of the vehicle.

The method to activate the gaze control may be described as passive activation (e.g. contextual or relative engagement by holding the device or proximity of the finger to the controller). Compared to other concepts the passive activation may be less confusing and does not require additional steps or feedback (e.g. the user does not know whether a tap in an active activation activate the system or select something the cursor is over). The contextual or relative engagement does not require a consciously executed user input—it eliminates this additional step (e.g. by holding the floating jewel or similar device, finger proximity, eye gaze (to the floating jewel itself, etc.), etc.

More details and aspects of the concept are mentioned in connection with the proposed concept or one or more examples described above or below (e.g. FIGS. 1 to 2 and 4 to 8). The concept may comprise one or more additional optional features corresponding to one or more aspects of the proposed concept or one or more examples described above or below.

Figure 4:
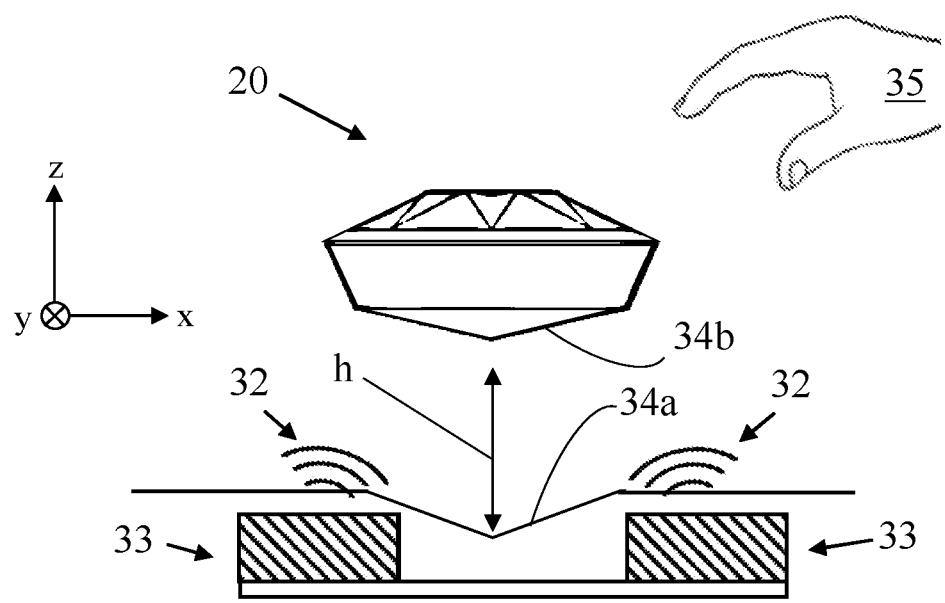
FIG. 4 shows a further example of a system for user interaction with a floating device.

FIG. 4 shows a further example of a system for a user interaction device with a floating device. Electromagnetic coils 33 (and/or permanent magnets and/or electro-magnets) of the base element 31 are schematically shown. The system 30 may be configured to levitate the floating device in a height h above the base element (e.g. in a range between 1 mm and 60 mm). The floating device and the base element 31 may each comprise corresponding mating elements 34a, 34b which may enable to position or fix the floating device in a docking position on the base element 31 (e.g. in a fixed connection with the base element 31).

For example, in a levitating mode of the floating device (as shown in FIG. 4), a user 35 may tilt, rotate or push the floating device to give user input, for example. Due to the 3D shape (e.g. faceted shape) of the top surface of the floating device by use of the optical faceplate 10, the user 35 may experience an improved visibility of the output display content of the floating device, for example in all operation positions of the floating device.

More details and aspects of the concept are mentioned in connection with the proposed concept or one or more examples described above or below (e.g. FIGS. 1 to 3 and 5 to 8). The concept may comprise one or more additional optional features corresponding to one or more aspects of the proposed concept or one or more examples described above or below.

Figure 5:
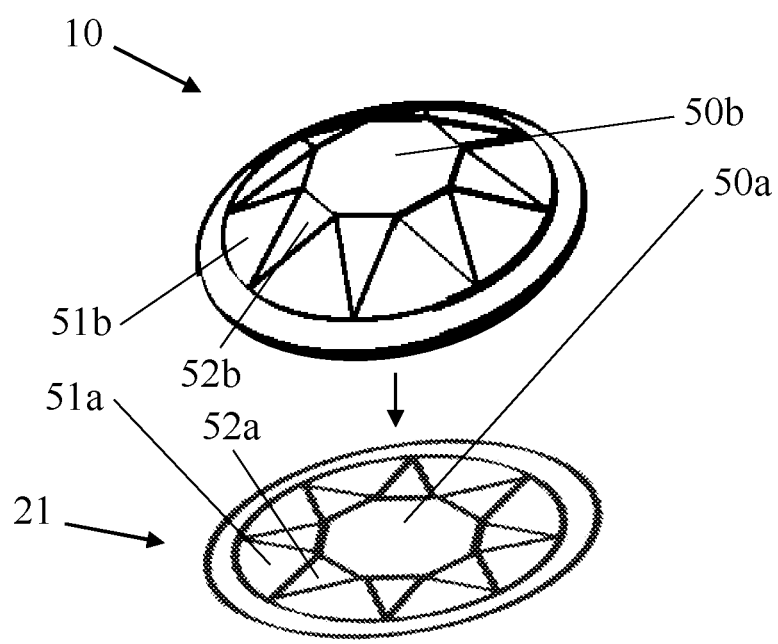
FIG. 5 schematically shows a display and an optical faceplate with corresponding display sections.

FIG. 5 schematically shows a display and an optical faceplate 10 with corresponding display sections. The optic light guide material of the optical faceplate 10 may be configured to transmit light of a portion of the 2D display 21 to a corresponding portion of the three dimensional display surface 12 of the optical faceplate 10. For example, light from a center portion 50a (e.g. hexagonal shape) of the 2D display 21 may be displayed on a center portion 50b (e.g. hexagonal shape; alternatively any other shape is possible, e.g. circular shape, e.g. polygon with more or less edges than a polygon shape of the 2D display center portion 50a). Similarly, the display content of a first triangular portion 51a and a second triangular portion 52a (e.g. adjacent portions) may be transmitted to corresponding portions 51b, 52b (e.g. also triangular) of the three dimensional display surface 12. The first portion 51b and second portion 52b of the three dimensional display surface 12 may have different textures, e.g. to provide different tactile perception for the user 35.

More details and aspects of the concept are mentioned in connection with the proposed concept or one or more examples described above or below (e.g. FIGS. 1 to 4 and 6 to 8). The concept may comprise one or more additional optional features corresponding to one or more aspects of the proposed concept or one or more examples described above or below.

Figure 6:
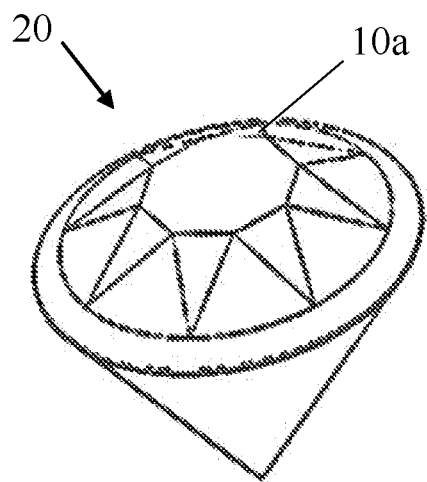
FIGS. 6 and 7 show examples of a user device with a 2D display and an optical faceplate with a 3D exterior surface.
Figure 7:
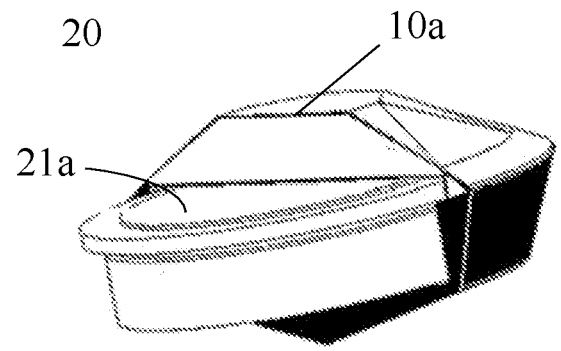

FIGS. 6 and 7 show examples of a user device comprising a display system 20 with a 2D display and an optical faceplate 10. FIG. 6 shows a first diamond shaped (e.g. diamond cut surface) user device with a facet shaped optical faceplate 10a. FIG. 7 shows an alternative form of a diamond shaped user device, wherein the facet shaped optical faceplate 10a is shown in a sectional view. Hence, a 2D display with a 2D display surface 21a can be seen which is in contact with the contact surface 11 of the optical faceplate 10a. In these examples, the contact surface 11 completely covers the 2D display surface 21a.

More details and aspects of the concept are mentioned in connection with the proposed concept or one or more examples described above or below (e.g. FIGS. 1 to 5 and 8). The concept may comprise one or more additional optional features corresponding to one or more aspects of the proposed concept or one or more examples described above or below.

Figure 8:
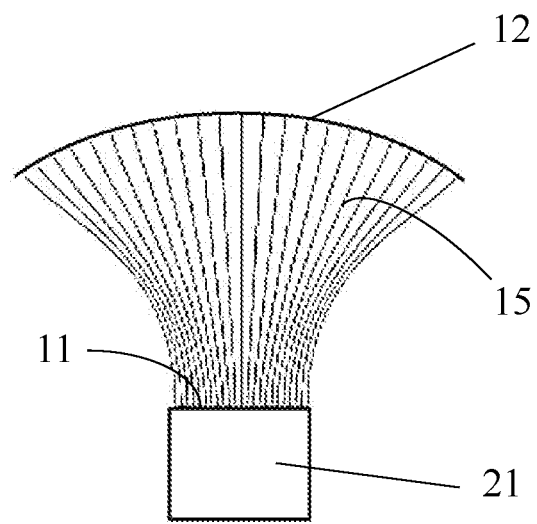
FIG. 8 exemplary shows a concept of extension of a 3D display surface of the optical faceplate compared to the 2D display.

FIG. 8 exemplary shows a concept of extension of a display surface of the optical faceplate 10 compared to the 2D display 21. As can be seen in FIG. 8, the contact surface 11 of the optical faceplate is in contact with the schematically shown display 21. The contact surface 11 is connected with the three dimensional display surface 12 by use of optic light guide fibers 15.

As the density of the optic light guide fibers 15 at the contact surface 11 is higher than at the corresponding portion of the three dimensional display surface 12, the areal extension of the corresponding portion of the three dimensional display surface 12 is larger than the areal extension of the portion of the 2D display 21 which is in contact with the contact surface 11. For example, the density of the optic light guide fibers 15 at the contact surface 11 and at the three dimensional display surface 12 are inverse proportional to the areal extension of the contact surface 11 and the corresponding portion of the three dimensional display surface 12.

The three dimensional display surface 12 as shown in FIG. 8 has a curved shape (e.g. dome shaped surface). However, e.g. by grinding the top surface of the optic light guide fibers 15, also a flat surface shape (or different flat portions, e.g. angled portions) can be provided, for example.

More details and aspects of the concept are mentioned in connection with the proposed concept or one or more examples described above or below (e.g. FIGS. 1 to 7). The concept may comprise one or more additional optional features corresponding to one or more aspects of the proposed concept or one or more examples described above or below.

An aspect of the present disclosure is creating a display (that would otherwise be flat, e.g. LED, OLED, LCD display) that can have a complex physical 3-dimensional exterior surface, for example. The optical faceplate 10 may enable that the exterior surface of the display can be seen to be 3-dimensional and give a 3-dimensional touch experience, for example. This may be achieved due to mapping digital display graphics (e.g. GUI, motion graphics, images, etc., e.g. the display content of the 2D display 21) to the exterior surface (e.g. the three dimensional display surface 12) which may be provided in any complex 3-dimensional form or surface (e.g. faceted surfaces of the display system, e.g. like a diamond) such that the graphics appear to reside on the surface of the 3-dimensional form (e.g. on the exterior surface of the display system).

For example, simply placing a simple optical lens (e.g. convex lens) on a display may give the appearance of a magnified display (e.g. one is looking into the display via the lens and the appearance of the image is highly dependent on the viewing angle/position of the user) but might not give the impression of the image appearing on the surface of optical lens, for example. However, the general idea can be applied to a display system, e.g. to a touch-screen display or interface—such that a user's touch input and touch gestures on the exterior surface of the 3-dimensional form may be recognized with different sensor approaches (e.g. capacitive film, camera based sensor, etc.). For example, in contrast to a simple lens, the optical faceplate 10 may enable defined mapping or projection of separate portions of the 2D display to corresponding portions of the three dimensional display surface 12.

An aspect relates to a faceplate for a digital display consisting of a polymer or glass based fiber optic light guide material. The fiber optic material (glass or polymer based) may enable light to be channeled through the material such that it appears to be or is mapped to the external surface of the display faceplate. Light rays emitting from the display pixels (of the 2D display, for example) are input into the individual fibers of the material and exit from the fibers at the location of the fiber on the external surface of the 3-dimensional form of the faceplate.

The mapping of the display's digital image (e.g. the 2D display's 21 content) to the external form of the faceplate (e.g. the three dimensional display surface 12) may give the impression to the user of a physically 3-dimensional display (by visual appearance and to the user's physical touch). For example, touch sensing may be added to the faceplate to create a 3-dimensional interactive GUI (graphical user interface). Proposed concepts may be applied to displays of any size (e.g. on a small controller (e.g. diameter 30 mm), combi/instrument cluster display, etc.). The optical faceplate 10 may be small (e.g. for a user input/output device; e.g. with a contact surface 11 of a size of less than 20 cm$^2$ or less than 10 cm$^2$) or large (e.g. for a display device of a screen or monitor; e.g. with a contact surface 11 of a size of more than 100 cm$^2$ or more than 200 cm$^2$).

For example, the faceplate may be configured to be movable relative to the 2D display. This may enable a dynamic visual effect. An example is a large display that has a faceplate that acts as a dial that can be rotated. The rotation of the dial/faceplate can be monitored and the graphic displayed on the display altered dynamically (the graphic content would be mapped to correspond to the area within the dial/faceplate vs. the area outside/surrounding the dial), for example.

A small circular (e.g. 30-40 mm diameter) high resolution display (e.g. OLED display) may be optically coupled to a faceplate made of the fiber optic material (polymer or glass based). The faceplate may have a complex 3-dimensional form (geometry) similar to the faceted cuts on a diamond/gem, for example. This may enable the digital image (e.g. GUI, animation, motion graphics, static graphics, digital media, movie clip, etc.; e.g. display content) to be mapped to the surface of the display system—giving the impression of a 3-dimensional display to the user, for example.

Touch sensitivity (e.g. by capacitive sensing, camera based sensing, Lidar, etc.) may enable the device (e.g. display system) to be an interactive GUI, such that the display system would appear to respond to the touch of the user; e.g. by changing graphics, animations, motion, color, brightness, etc.). Touch sensitivity to a 3-Dimensional interface such as the faceplate may provide a 3-dimensional affordance to the user—i.e. there is physical form geometry to guide the user's finger, for example. This provides a more sensory rich interaction as well as a guide (e.g. conventional 2D touch-screens might be notoriously difficult to use in a moving vehicle as there is no means to steady the finger when reaching out to touch the touchscreen).

In addition or as alternative, the display system may also act as a physical interactive medium for any user system (e.g. intelligent personal assistant), a replacement for a controller, e.g. a controller of a vehicle (e.g. a central touchpoint for controlling the vehicle or a vehicle's system), or a remote touch gesture interface, e.g. a button-less controller, for controlling a larger central display. For example, the display system may function as part of a 3-dimensional user interaction controller.

An aspect relates to a 3-Dimensional Display Faceplate. Such Faceplate may be used in combination with displays and touchscreens for automotive, commercial (e.g. industrial, medical, etc.) and consumer applications, for example. Further, it may be used in combination with interactive GUIs that may benefit from an enriched sensory experience, a richer 3-dimensional aesthetic and/or functional benefits of having a 3-dimensional surface to guide the touch and sight of the user, for example. By the provided concept, it may be possible to replicate a truly 3-dimensional display without necessarily the technological advance in display geometry, for example.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded. Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A system comprising:
   a floating device which is at least configured as an output device for a user interface; and
   a base element for the floating device;
   wherein the system is configured to hold the floating device in a balanced position above the base element in an operation mode of the system,
   wherein the floating device comprises a two dimensional display, and
   wherein an optical faceplate is positioned on the two dimensional display of the floating device,
   wherein the optical faceplate comprises
      a contact surface at a bottom side of the optical faceplate for contacting the two dimensional display;
      a three dimensional display surface at a top side of the optical faceplate, wherein the three dimensional display surface has a facet shape; and
      an optic light guide material provided between the contact surface and the three dimensional display surface.

2. The system according to claim 1,
   wherein the optic light guide material of the optical faceplate comprises at least one of polymer, glass, or a composite transparent material.

3. The system according to claim 1,
   wherein the optic light guide material of the optical faceplate is a fiber based material.

4. The system according to claim 1,
   wherein an areal extension of the contact surface differs from an areal extension of the three dimensional display surface.

5. The system according to claim 4,
   wherein the areal extension of the three dimensional display surface is at least 1.3 times the areal extension of the contact surface.

6. The system according to claim 1,
   wherein the three dimensional display surface of the optical faceplate comprises at least two plane surface portions that are arranged to each other at an angle of at least 10 degrees.

7. The system according to claim 1,
   wherein the three dimensional display surface comprises a plurality of plane surface portions,
   wherein a first subset of the plurality of plane surface portions has a polished surface, wherein a second subset of the plurality of plane surface portions has a textured surface.

8. The system according to claim 1, further comprising a sensor configured to detect a touch of a user on the three dimensional display surface to provide a touch screen functionality of the three dimensional display surface.

9. A vehicle comprising a system according to claim 1,
   wherein the system is configured to activate a gaze control function of the vehicle when a user touches the floating device of the system.

* * * * *